Jan. 22, 1929.
A. L. KUHLMAN
RULE
Filed Aug. 10, 1927
1,699,847
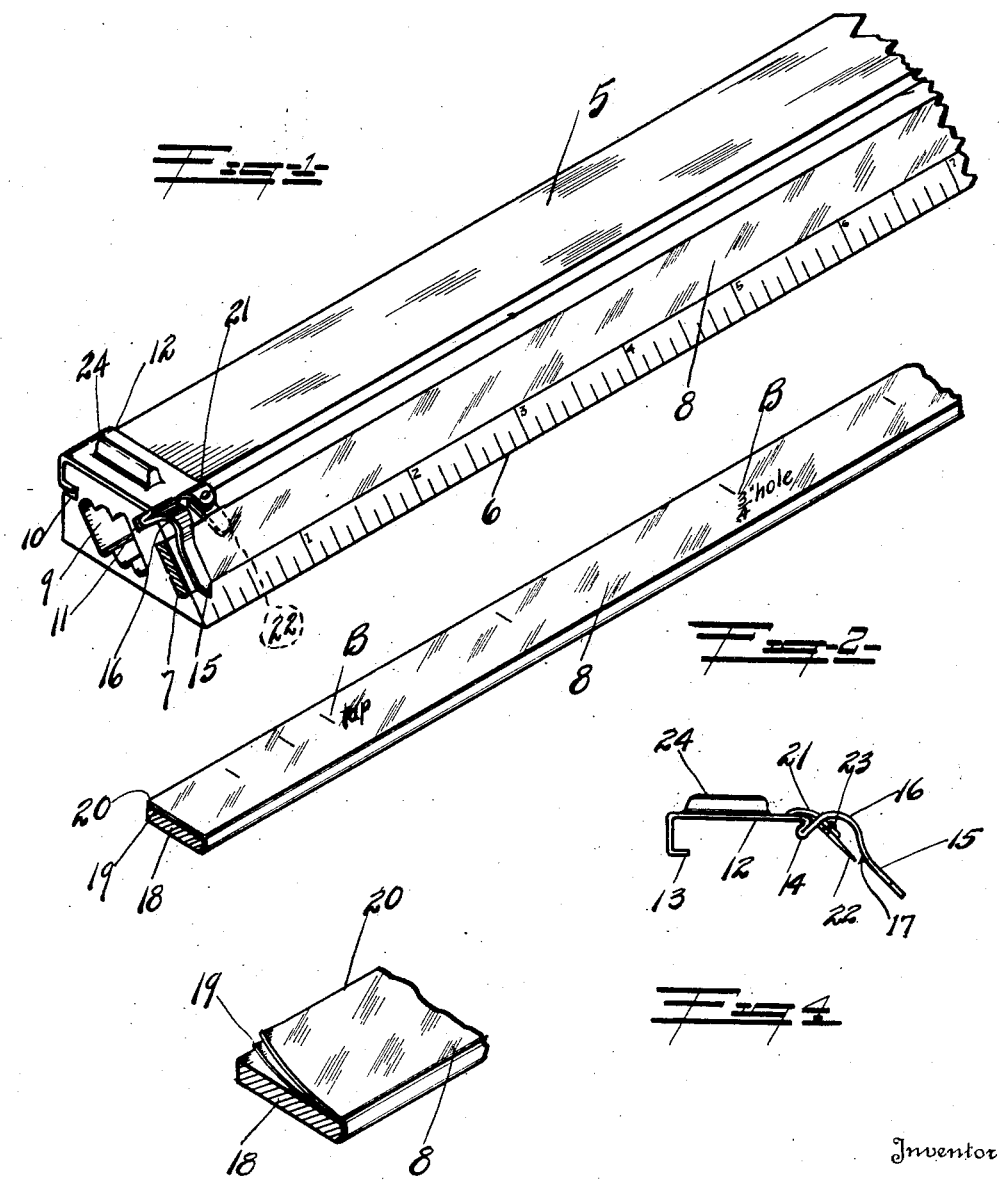
Inventor
Arthur L. Kuhlman.
By Frank C. Fearman.
Attorney Patented Jan. 22, 1929.

1,699,847

UNITED STATES PATENT OFFICE.

ARTHUR L. KUHLMAN, OF BAY CITY, MICHIGAN.

RULE.

Application filed August 10, 1927. Serial No. 212,027.

The present invention relates to measuring rules, and particularly to a rule provided with a detachable filler on which the measurements are recorded.

The prime object of the invention is to design a rule provided with a removable filler, and slidable means co-operating therewith, whereby any number of measurements can be recorded, so that the filler member may be removed and filed if desired, and a new filler strip inserted.

A further object is to provide a recording strip or filler from which the measurements can be easily and automatically removed.

Another object of the invention is to provide simple and economical means for indicating the measurements on the filler member.

The above and other objects will appear as the specification progresses, reference being had to the accompanying drawing in which I have shown the preferred embodiment of my invention, and in which like reference numerals indicate like parts throughout the several views thereof.

In the drawing,

Fig. 1 is a fragmentary isometric view of my improved rule.

Fig. 2 is a fragmentary isometric view of the filler strip.

Fig. 3 is also an enlarged fragmentary isometric view of the filler strip.

Fig. 4 is an end view of the shiftable indicating member.

In measuring an article, space, machine or in fact anything on which the size is required, it is necessary to take a number of measurements, it is customary to place them on a sheet of paper, together with a sketch and proper notations so that they may be filed for future information, this necessitates an extra sheet of paper on which the figures and notations must be recorded with the possibility of error in the transferring, this consumes time, and the possibility of error is ever present, and I have therefore designed a measuring rule provided with a filler strip on which the measurement is automatically recorded as taken, which can be filed for future reference, or if desired the record can be quickly and automatically removed.

Referring now particularly to the drawing, the numeral 5 indicates the body of the rule which can be formed of wood or any other suitable material, the front being beveled as shown at 6, and the proper indicia is provided as shown.

A groove 7 is provided in the rule directly above this indicia, and a detachable filler member 8 is adapted to be mounted thereon, extra fillers being carried in the chamber 9 which is suitably formed to receive them. Grooves 10 and 11 are provided in the back edge and top respectively of the rule, and an indicator member 12 is slidably mounted in said grooves, the groove 11 being cut at an angle as shown so that the indicator is locked thereon.

The indicator proper is preferably a stamping, and comprises an inwardly turned leg 13 adapted to engage in the groove 10, the top of the stamping being crimped to form a leg 14 which is bent inwardly as shown to engage the groove 11 and frictionally secure the indicator on the rule.

A finder 15 is formed integral with the indicator, being bowed over the filler 8 as shown at 16, and is provided with a pin or lug 17 adapted to engage the face of the filler 8 when pressure is exerted on the bow 16 by the user or the flexing of the bow of the finder, causing the pin to travel a limited distance on the face of the filler, and making a mark as clearly shown at "B" in Fig. 2.

The filler can be made up the same as are score-cards, bridge pads, etc., which comprises a rigid cardboard base 18, the upper surface of which is suitably treated, a sheet of carbon paper 19 is placed on this base, and a transparent sheet 20 covers said paper, this sheet being formed of glucose or a similar material, so that when a pressure (similar to writing with a pencil) is exerted thereon, it will reproduce a mark or other indicia as indicated at Fig. 2 of the drawing, and any notation can also be written and is clear and distinct.

These lines and notations are easily removed by merely separating the upper sheets from the base, and this I accomplish by providing a thin finger member 21, which I secure to the leg 22 by means of a small rivet 23 forming a frictional connection thereat, normally this finger is in position as shown in Fig. 1, but when it is desired to preserve a record for filing or future use, this finger is swung out at right angles to its normal position and out of engagement with the sheets 19 and 20.

It will also be obvious that a plain card board filler may be used and the pin or leg 17 replaced by a pencil or similar instrument.

A finger grip 24 is provided on the indicator stamping as shown, and facilitates its movements on the rule, and this can be welded or otherwise secured in position, or it can be formed from the stamping proper.

The fillers are usable over and over again, can be readily inserted and removed, and will last for a long period of time.

What I claim is:—

1. A rule having a groove therein, an indicator member slidably mounted thereon, a laminated filler member mounted in said groove, means on the indicator for engaging said laminated filler to record a measurement thereon, and means on the indicator for separating said laminations as the indicator is shifted.

2. A rule having a stamped indicator member slidably mounted thereon, a filler member mounted on said rule, a resilient finder formed integral with the indicator, a pin projecting therefrom and adapted to engage the filler member for recording a mark thereon, there being a longitudinally disposed chamber in said rule.

3. A rule having an indicator member slidably mounted thereon, a laminated filler member removably mounted on said rule, a finder on the indicator and adapted to be pressed into engagement with said filler for recording a mark thereon, and means on the indicator for automatically separating said laminations to remove said mark when the indicator is shifted.

4. A rule having a groove therein, an indicator slidably mounted thereon, a filler member positioned in said groove, and means on the indicator for engaging said filler for recording a measurement thereon.

5. A rule having a groove therein, an indicator slidably mounted thereon, there being indicia on the rule directly adjacent the groove, a filler member removably positioned in said groove, and means on the indicator for engaging said filler member for recording a measurement thereon.

In testimony whereof I hereunto affix my signature.

ARTHUR L. KUHLMAN.